United States Patent
Kleczewski

(10) Patent No.: US 9,476,757 B2
(45) Date of Patent: Oct. 25, 2016

(54) RESONANT-CIRCUIT WEIGHING SYSTEM FOR A CONVEYOR BELT

(71) Applicant: Laitram, L.L.C., Harahan, LA (US)

(72) Inventor: Lazio Kleczewski, Oostzaan (NL)

(73) Assignee: Laitram, L.L.C., Harahan, LA (US)

( * ) Notice: Subject to any disclaimer, the term of this patent is extended or adjusted under 35 U.S.C. 154(b) by 162 days.

(21) Appl. No.: 14/253,577

(22) Filed: Apr. 15, 2014

(65) Prior Publication Data
US 2015/0292935 A1 Oct. 15, 2015

(51) Int. Cl.
| G01G 13/16 | (2006.01) |
| G01G 19/00 | (2006.01) |
| B65G 17/30 | (2006.01) |
| B65G 17/08 | (2006.01) |
| G01G 19/03 | (2006.01) |
| G01G 11/04 | (2006.01) |
| G01G 11/00 | (2006.01) |
| G01G 3/12 | (2006.01) |

(52) U.S. Cl.
CPC ............ *G01G 19/035* (2013.01); *B65G 17/30* (2013.01); *B65G 17/08* (2013.01); *G01G 3/12* (2013.01); *G01G 11/003* (2013.01); *G01G 11/04* (2013.01); *G01G 13/16* (2013.01); *G01G 19/00* (2013.01)

(58) Field of Classification Search
CPC .. G01G 19/00; G01G 19/035; G01G 11/003; G01G 11/04; G01G 3/13; G01G 3/15; G01G 3/12; G01G 13/16; B65G 17/08; B65G 17/30
See application file for complete search history.

(56) References Cited

U.S. PATENT DOCUMENTS

| 3,332,506 A | * | 7/1967 | Bradfield | G01G 3/13 177/210 C |
| 3,643,753 A | * | 2/1972 | Godwin | G01G 15/00 177/185 |
| 4,520,885 A | * | 6/1985 | Jeffrey | G01G 3/12 177/210 C |
| 4,663,589 A | * | 5/1987 | Fiori, Jr. | G01D 5/243 324/207.14 |
| 4,825,967 A | * | 5/1989 | Sakamoto | G01G 3/12 177/210 C |

(Continued)

FOREIGN PATENT DOCUMENTS

| JP | 2000249591 A | 9/2000 |
| WO | 2013-028378 A2 | 2/2013 |
| WO | 2013191217 A1 | 12/2013 |

OTHER PUBLICATIONS

International Search Report and Written Opinion of the International Searching Authority, PCT/US2015/021536, mailed Jun. 26, 2015, Korean Intellectual Property Office, Republic of Korea.

*Primary Examiner* — Randy W Gibson
(74) *Attorney, Agent, or Firm* — James T. Cronvich

(57) ABSTRACT

A conveyor belt and a weighing system for weighing articles conveyed on a conveyor belt. The conveyor belt includes an array of force-sensing elements embedded in the belt to measure forces normal to the belt's conveying surface. The force-sensing elements form parts of passive resonant circuits that each include a capacitor and an inductive coil. Either the capacitor or the inductive coil can be a force-sensitive element. Measuring circuits external to the belt include an oscillator having a coil that inductively couples to the resonant circuit in the belt as it passes closely by. A force applied to the belt at a force-sensitive element changes the resonant frequency of its resonant circuit, which also causes a change in the oscillator frequency. Frequency detectors in the measuring circuits measure that frequency change and convert it into a proportional force value used to compute the weights of conveyed articles on the fly.

13 Claims, 5 Drawing Sheets

(56) References Cited

U.S. PATENT DOCUMENTS

| | | | |
|---|---|---|---|
| 4,856,603 A * | 8/1989 | Murakoso | G01G 7/06 177/210 C |
| 5,359,154 A | 10/1994 | Tsukasa et al. | |
| 6,323,452 B1 | 11/2001 | Bonnet | |
| 6,376,784 B1 | 4/2002 | Morinaka | |
| 6,588,574 B2 * | 7/2003 | Koini | B25J 15/00 198/341.01 |
| 7,036,653 B2 | 5/2006 | Reznik et al. | |
| 7,635,060 B2 | 12/2009 | Lagneaux | |
| 9,004,271 B2 * | 4/2015 | Fourney | G01G 11/003 198/502.2 |
| 9,146,146 B2 * | 9/2015 | Laird | G01G 19/00 |
| 2009/0294248 A1 | 12/2009 | Sudkamp | |
| 2013/0221761 A1 | 8/2013 | Depaso | |
| 2014/0216894 A1 * | 8/2014 | Fourney | G01G 11/003 198/340 |

* cited by examiner

RESONANT-CIRCUIT WEIGHING SYSTEM FOR A CONVEYOR BELT

BACKGROUND

The invention relates generally to power-driven conveyors and more particularly to conveyor systems having force-sensitive elements embedded in a conveyor belt to weigh conveyed articles on the fly.

In some applications, individual articles have to be separately weighed while they are being transported on a conveyor belt. Conventional conveyor belt systems first singulate the conveyed articles so that they can be weighed sequentially at a weigh station the belt rides over. Singulating conveyor sections have to be inserted into the conveyor upstream of the weigh station to force the articles into a single file. Adding a singulating section to a conveyor system increases the length of the conveyor layout and reduces the usable width of the conveying surface. Japanese Patent Application Publication No. 2000-249591 A, published Sep. 14, 2000, describes load cells in load-detecting units mounted single file atop the chain. And International Application Publication No. WO 2013/028378 A2, published Feb. 28, 2013, describes a conveyor belt with load cells distributed along its length and width. But both those systems require power supplies and transmitters to be located on or in the belt or chain to power the load cells and associated electronics.

SUMMARY

One version of a conveyor belt embodying features of the invention comprises a belt body having an upper surface and a plurality of passive resonant circuits disposed at individual positions in the belt body. Each of the passive resonant circuits has a resonant frequency and includes a force-sensitive element. The force-sensitive element changes the resonant frequency of the passive resonant circuit as a function of the force applied to the force-sensitive element.

In another aspect of the invention, a weighing system embodying features of the invention comprises a conveyor belt and a number of measuring circuits near the bottom side of the conveyor belt. The conveyor belt includes a plurality of passive resonant circuits disposed at individual positions on the conveyor belt. Each of the passive resonant circuits has a resonant frequency and includes a force-sensitive element that changes the resonant frequency of the passive resonant circuit as a function of the force applied from conveyed articles on the top side of the belt to the force-sensitive element. Each of the measuring circuits includes an oscillator oscillating at a nominal frequency. An inductive coil in each measuring circuit inductively couples the oscillator to one of the passive resonant circuits near the inductive coil as the conveyor belt passes. The changes in the resonant frequency of the passive resonant circuit change the frequency of the oscillator from its nominal frequency as a function of the force applied by conveyed articles on the top side of the conveyor belt to the force-sensitive element.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
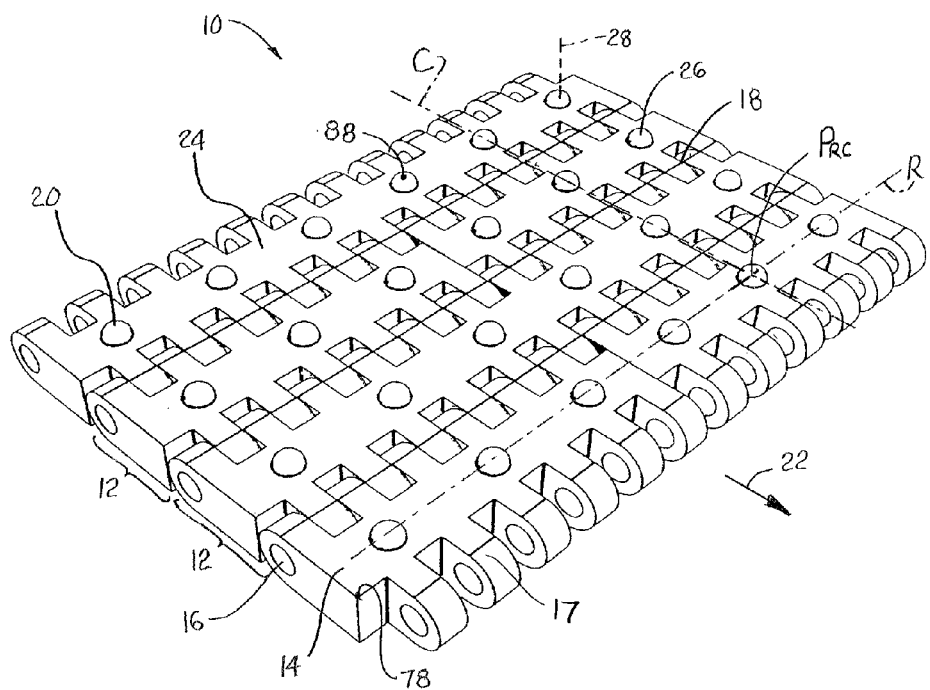
FIG. 1 is a perspective view of a portion of a conveyor belt embodying features of the invention.

A portion of one version of a conveyor belt embodying features of the invention is shown in FIG. 1. The conveyor belt 10 is a modular plastic conveyor belt constructed of a series of rows 12 of one or more plastic belt modules 14 hingedly connected end to end by hinge rods 16 or pins in interleaved hinge elements 17 forming hinge joints 18 between consecutive rows. The belt modules 14 are conventionally injection-molded out of a thermoplastic polymer, such as polypropylene, polyethylene, acetal, or a composite polymer. Force-sensitive elements 20 are embedded in the conveyor belt 10 at individual positions. In this version, the force-sensitive elements are arranged in a two-dimensional array of rows R across the width of each belt row 12 and columns C along the length of the belt in a conveying direction 22. In this way, the position of an individual force-sensitive element 20 can be defined as $P_{RC}$, where R represents the row (or belt row if each belt row has only one row of force-sensitive element) and C represents the column from one side of the belt to the other. The density of the array or the separation between rows and columns of force-sensitive elements for a given belt may be determined with a priori knowledge of the sizes and shapes of the conveyed articles. In this version, each force-sensitive element 20 is mounted at the outer conveying surface 24 of the belt 10. The force-sensitive elements may be protected by a cover 26 that may be domed to form a salient protrusion slightly above the belt's conveying surface 24 so that the entire weight of a conveyed article is borne by a group of the covers. The force-sensitive elements have sensing axes 28 that are perpendicular, or normal, to the conveying surface 24 to measure forces applied normal to the conveying surface at the positions of the force-sensitive elements on the belt.

Figure 2:
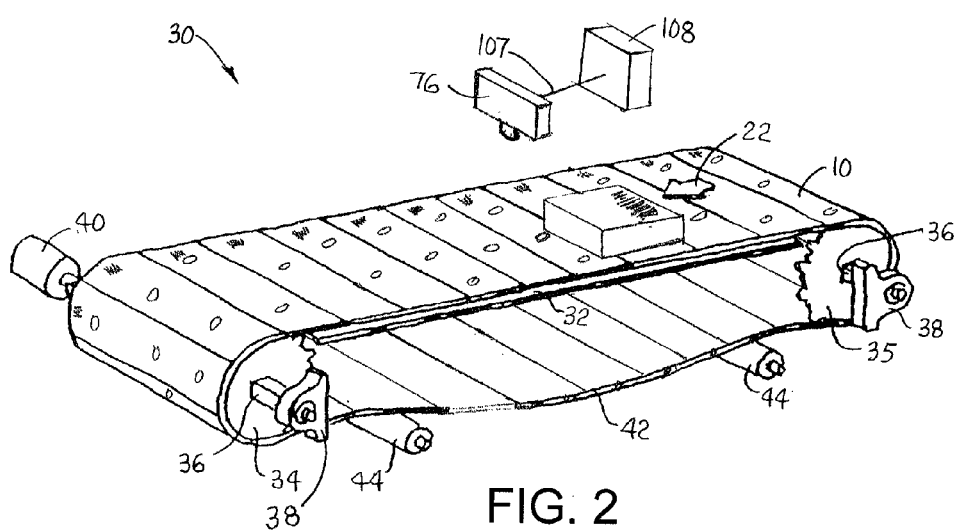
FIG. 2 is an isometric view of a conveyor system using a conveyor belt as in FIG. 1.

The conveyor belt 10 is shown in a weighing system 30 in FIG. 2. The conveyor belt advances in the conveying direction 22 along an upper carryway 32. The endless belt is trained around drive and idle sprocket sets 34, 35 mounted on shafts 36, whose ends are supported in bearing blocks 38.

A drive motor 40 coupled to the drive shaft rotates the drive sprockets 34, which engage the underside of the belt and drive the belt in the conveying direction 22 along the upper carryway 32. The belt returns along a lower returnway 42. Rollers 44 support the belt in the returnway and reduce the maximum catenary sag.

Figure 3:
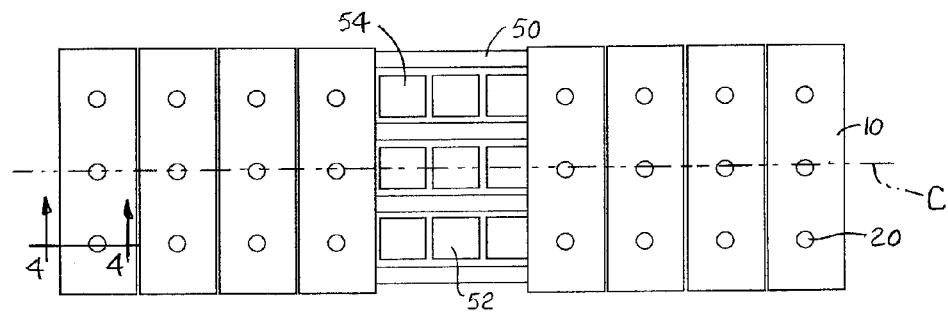
FIG. 3 is a top plan view of a portion of the conveyor system of FIG. 2 partly cut away.

As shown in FIG. 3, the conveyor belt 10 is supported along the carryway atop wearstrips 50. Activating circuits 52 for the force-sensitive elements 20 are housed in housings 54 whose top surface is at or slightly below the level of the tops of the wearstrips 50. The activation circuits 52 are arranged in columns aligned with columns C of the force-sensitive elements 20 in the conveyor belt 10.

Figure 4:
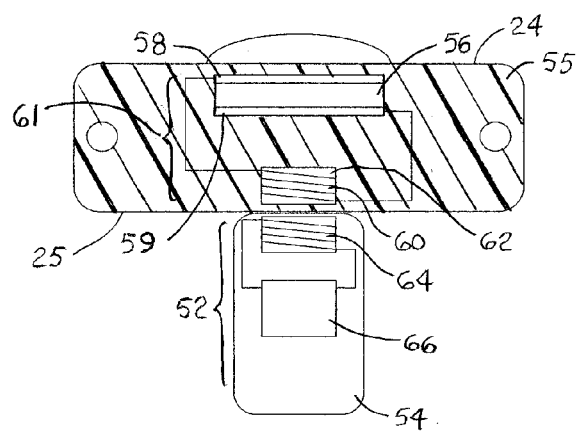
FIG. 4 is a cross section of the conveyor system of FIG. 3 taken along lines 4-4 and showing a capacitive force-sensitive element.

A cross section of one belt row is shown in FIG. 4. Embedded in the plastic belt module 55 is a capacitor 56 having an upper plate 58 and a lower plate 59. The two plates are shown parallel to each other and to the top conveying surface 24 of the belt in the absence of articles atop the belt. The plates are electrically wired to opposite ends of an inductive coil 60 wrapped around a bobbin 62 near the bottom side 25 of the belt. The capacitor is electrically connected across the inductive coil 60 to form a passive, high-Q resonant circuit 61. The external activation circuit 52 includes an oscillator and an activation coil 64 that is inductively coupled to the belt coil 60 passing by. The two coils are positioned close enough for the activation coil to couple inductively to the passive resonant circuit in the belt. The activation coil 60 is connected to support electronics 66 in the housing 54.

Figure 5:
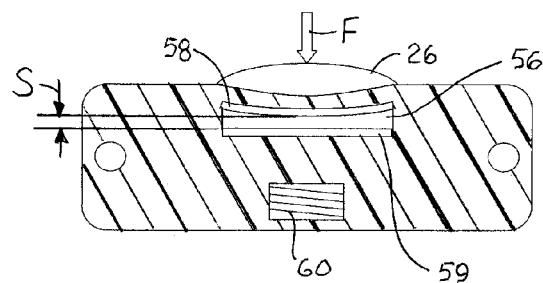
FIG. 5 is a view of the belt portion of FIG. 4 shown with a downward force applied to deform the capacitor.

As shown in FIG. 5, a downward force F such as produced by the weight of a conveyed article sitting atop the cover 26, causes the upper plate 58 of the capacitor 56 to deflect or move downward. The reduction in the separation S between the deflected upper plate 58 and the rigid, fixed lower plate 59 causes the capacitance to proportionally increase because capacitance is inversely proportional to the distance between the plates. And because the movement of the upper plate is proportional to the applied force F, the capacitance is proportional to the force applied to the cover 26 by a supported article. Thus, the capacitor 56 is a force-sensitive element in the example of FIG. 5. Any change in capacitance causes a change in the resonant frequency of the passive L-C circuit formed by the inductive coil 60 and the capacitor 56. Together, the resonant circuit 61 in the belt and the oscillator in the external circuit 66 form a distributed load cell with a sensing-circuit portion in the belt and a measuring-circuit portion external to the belt.

Figure 9A:
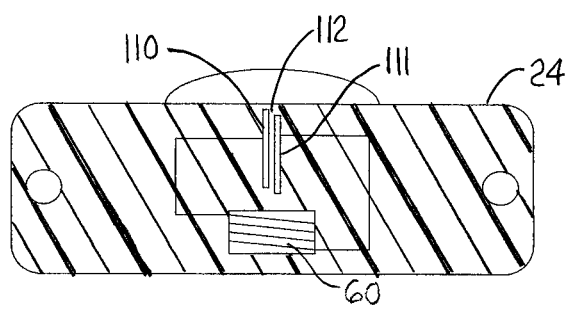
FIGS. 9A and 9B are cross sections of a belt portion in a conveyor system as in FIG. 3 showing another version of a capacitive force-sensitive element in the absence and in the presence of a downward-acting force on the belt.
Figure 9B:
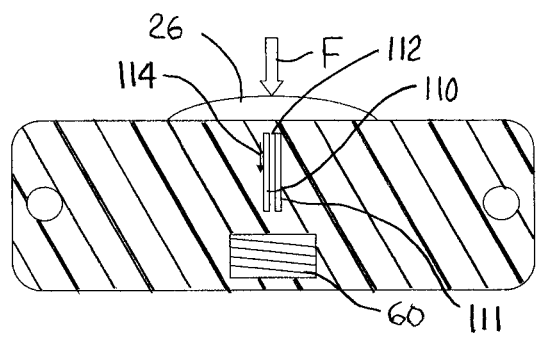

Another version of a force-sensitive capacitor is shown in FIGS. 9A and 9B. In this version the plates 110, 111 of the capacitor 112, i.e., the planes defined by the plates, are generally perpendicular to the top surface 24 of the conveyor belt. The first plate 110 is vertically movable, while the second plate 111 is rigidly fixed in place. When no downward force acts on the protrusion 26, the two plates 110, 111 are vertically offset from one another as shown in FIG. 9A. When a downward force F is applied by the weight of a conveyed article, as in FIG. 9B, the movable plate 110 moves downward 114 increasing the area between the two plates and proportionally increasing the capacitance and reducing the resonant frequency of the L-C circuit. Of course, the two plates could alternatively be positioned in parallel with no vertical offset in the absence of a force. In such a design, a downward force would push one plate downward relative to the other to increase the offset, decrease the area between the plates, decrease the capacitance, and increase the resonant frequency of the L-C circuit.

Like the capacitor 56 in FIG. 4, the capacitor 112 of FIGS. 9A and 9B is connected across the inductive coil 60.

Figure 10A:
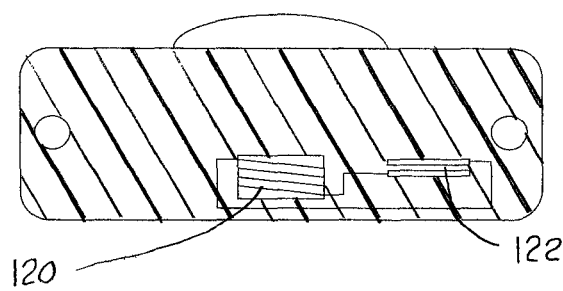
FIGS. 10A and 10B are cross sections of a belt portion in a conveyor system as in FIG. 3 showing an inductive force-sensitive coil in the absence and in the presence of a downward-acting force on the belt.
Figure 10B:
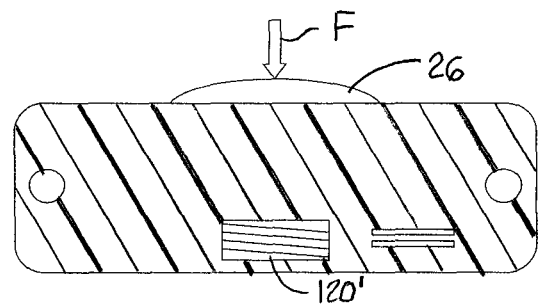

FIGS. 10A and 10B show another version of a force-sensitive resonant circuit. In this version, an inductive coil is the force-sensitive element. The coil 120 is electrically connected to a fixed-capacitance capacitor 122 to form a passive resonant L-C circuit. When a downward force F is applied to the protrusion 26, the coil 120' is compressed like a spring, as shown in FIG. 10B. The decreased length of the coil increases the inductance of the coil 120' and reduces the resonant frequency of the L-C circuit. A downward force increasing the cross section of the coil would also increase the inductance of the coil 120. In fact, other force-induced changes in the geometric shape of the coil can affect its inductance and the resonant frequency of the passive L-C circuit.

Figure 11:
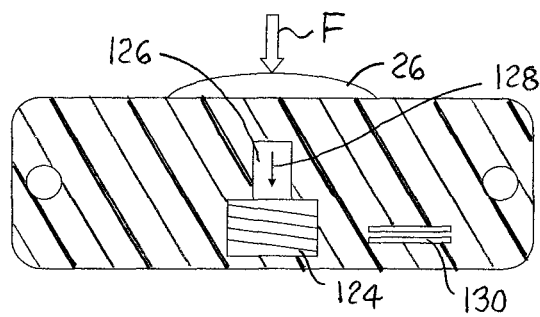
FIG. 11 is a cross section as in FIG. 10B in which the core of the coil changes the inductance of the coil when a downward-acting force acts on the belt.

FIG. 11 shows an alternative force-sensitive coil 124. The coil's geometry is fixed, but a downward force F on the protrusion 26 pushes a metallic core 126 with a high permeability downward deeper into the coil 124. The increased penetration depth of the core increases the permeability and the inductance of the coil 124 and decreases the resonant frequency of the L-C circuit formed by the coil and a fixed capacitor 130. Alternatively, the inductance can be increased by moving a conductive ring to move closer to or encircle more windings of the coil or moving a conductive plate closer to the coil, or both. Of course, the core, plate, or ring could be arranged relative to the coil to decrease the inductance and increase the resonant frequency under the influence of a force on the conveyor belt that decreases the penetration of the core or increases the distance of the plate or ring from the coil.

Figure 6:
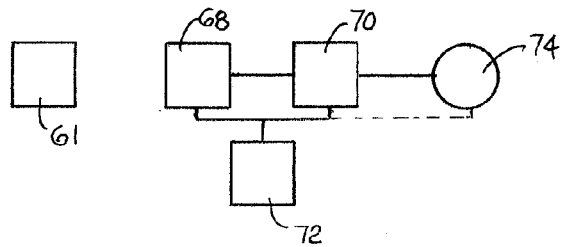
FIG. 6 is a block diagram of a distributed load-cell system usable in the conveyor system of FIG. 2.

A block diagram of one load cell of a weighing system is shown in FIG. 6. The load cell includes the passive resonant circuit 61 in the belt forming the sensing circuit and an oscillator 68, including the activation coil, in the external housing. The sensing circuit in the conveyor belt may be made of discrete electrical components embedded in the belt, or it may be made smaller using microelectromechanical-systems (MEMS) technology. The oscillator is set to oscillate at a frequency that is close to the resonant frequency of the resonant circuit 61 in the belt. When the resonant circuit is near the activation coil, the coil, acting as an antenna, inductively couples the resonant circuit 61 to the oscillator 68. The interaction of the resonant circuit 61 with the oscillator 68 changes the oscillator frequency in accordance with the capacitance change in the resonant circuit. The frequency of the oscillator 68 is measured by a frequency detector 70. The oscillator and the frequency detector 70, which form the measuring circuit of the distributed load cell, are powered by a power supply 72. The change in frequency of the oscillator is proportional to the downward force on the capacitor 56. The frequency detector's output is converted into a weight and recorded locally or remotely in a data recorder 74.

Figure 7:
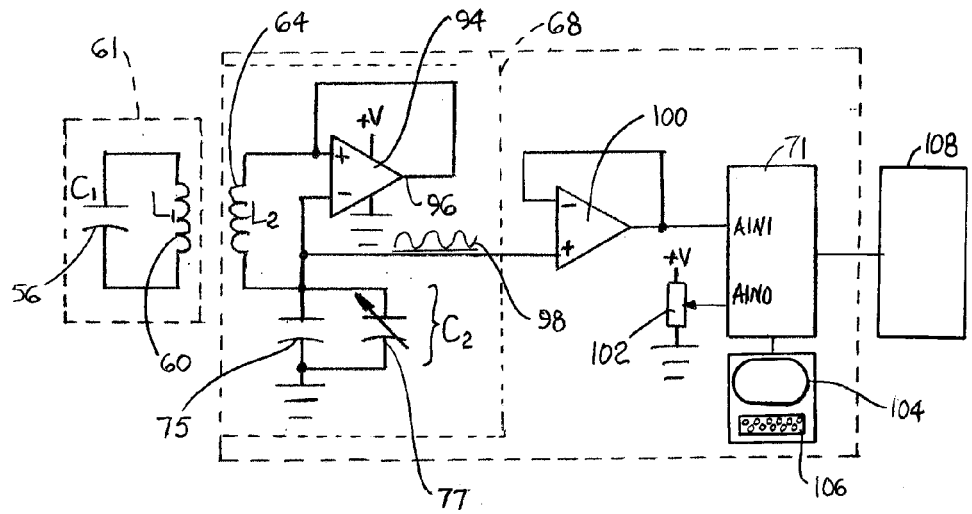
FIG. 7 is an electrical schematic/block diagram of a load-cell system as in FIG. 6.

A more detailed circuit diagram is shown in FIG. 7. The passive resonant circuit 61 includes the capacitor 56, whose capacitance changes with an applied force, and the coil 60. The coil 60 is an inductor with inductance $L_1$, and the capacitor 56 has a capacitance $C_1$ that is a function of the applied force. The coil also has a small series resistance. No power source is needed in the belt. The resonant frequency (in Hertz) is given by $f_r = 1/[2\pi(L_1 C_1)^{1/2}]$. The external oscillator 68 includes the activating coil 64 with inductance $L_2$ and a small resistance not depicted in FIG. 7. A capacitor 75 having a fixed capacitance in parallel with a trim capacitor 77 having a variable capacitance is connected between one end of the activating coil 64 and ground. The combined capacitance of the fixed and variable capacitors 75, 77 is $C_2$. The other end of the coil 64 is connected to the non-inverting input (+) of an operational amplifier (op amp) 94. The junction of the coil 64 and the capacitors 76, 78 is connected to the inverting input (−) of the op amp 94. Positive feedback is applied by connecting the output 96 of the op amp 94 to its non-inverting input (+) to maintain oscillation at the nominal oscillator frequency given by $f_n=1/[2\pi(L_1C_1)^{1/2}]$. The trim capacitor 77 is adjusted to set the nominal oscillator frequency, i.e., the frequency of the oscillator when uncoupled from the resonant circuit 61 in the belt, to a value close to the resonant frequency fr of the resonant circuit 61.

The op amp 94 is operated single-ended with its upper voltage rail at a positive voltage V (e.g., +5 Vdc) and its lower voltage rail at ground. The positively biased sinusoidal waveform 98 produced by the oscillator 68 is buffered in an emitter-follower op amp 100 circuit serving as a buffer amplifier with high input impedance so as not to load the oscillator circuit. The buffered oscillator signal is applied to the frequency counter. The frequency counter may be realized with analog and digital logic circuits or with a microcontroller.

In FIG. 7, the frequency detector is realized with a microcontroller 71. The buffered oscillator waveform is applied to the negative input AIN1 of the microcontroller's analog comparator. The positive input AIN0 is connected to the wiper arm of a potentiometer 102 forming an adjustable voltage divider with the supply voltage V. Whenever the amplitude of the oscillator waveform at the negative comparator input AIN1 crosses the threshold voltage at the positive comparator input AIN0 set by the potentiometer, an interrupt is generated in the microcontroller. The interrupt is serviced by a firmware routine that increments a counter counting the number of cycles of the oscillator waveform. The total cycle count in a predetermined time interval is proportional to the oscillator frequency. The cycle count is reset to zero at the start of the next interval. Thus, the frequency detector is realized as a frequency counter in this example. But other methods of detecting the frequency could be used. For example, the microcontroller could be a digital-signal-processing (DSP) device capable of performing Fast Fourier Transform (FFT) or Fast Hartley Transform (FHT) algorithms on the oscillator waveform to extract its frequency. In that case, the frequency detector is realized as a spectrum analyzer.

When the resonant circuit 61 in the belt is far from the oscillator 68, the oscillator's nominal frequency $f_n$, is unaffected by the resonant circuit. As the belt advances and the resonant circuit 61 comes in close proximity to the oscillator 68, the interaction between the two circuits increases. The oscillator's frequency changes from its nominal frequency $f_n$. The frequency detector detects that change in frequency. When the frequency detector is implemented as a frequency counter in a microcontroller as previously described, the cycle count in the predetermined interval is a measure of the force acting on the capacitor 56 in the belt. Because the frequency change is also a function of the proximity of the belt coil 60 to the oscillator coil 64, a microcontroller routine reports the maximum change in frequency from nominal as the best measure of the force applied to the belt capacitor 56. The microcontroller converts the cycle count to a weight value. The microcontroller 71 may be connected to a user interface including an output display 104 and a manual input device, such as a keyboard 106. The microcontroller 71, along with the microcontrollers in the other activation units, is also connected directly or wirelessly to a main controller 108.

Figure 8:
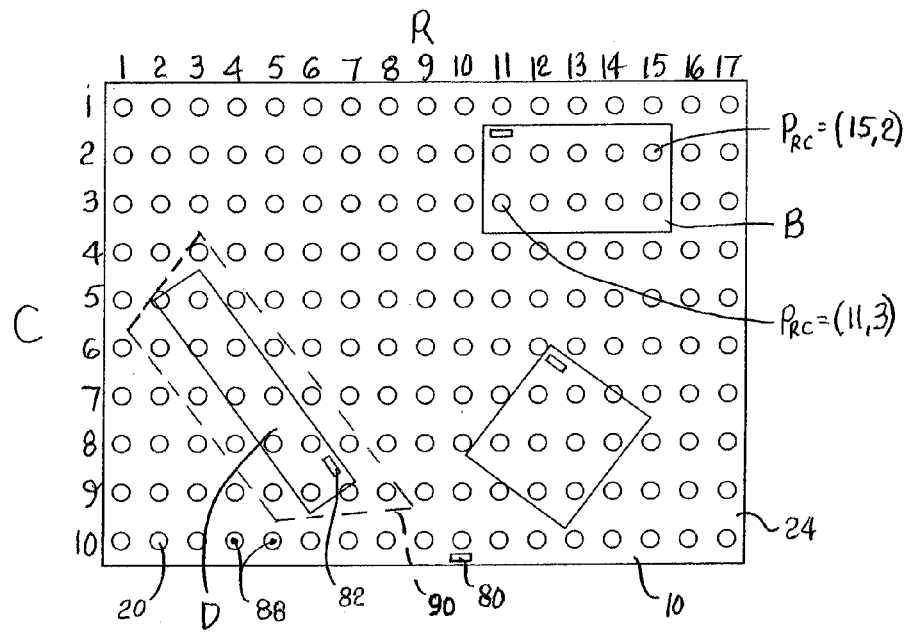
FIG. 8 is a top schematic of the conveyor system of FIG. 2.

A vision system as in FIG. 1 includes a camera 76 or other optical detector supported above the carryway 32 to vision a portion of the conveying surface. Optical signals 107 from the camera are sent to a main controller 108. The main controller executes a pattern-recognition process to determine the footprints of individual articles conveyed on the belt from the optical signals. With a priori knowledge of the load-cell-array geometry relative to a point on the belt, such as a belt-module corner 78, the vision system can determine relatively a group of load cells under an individual article's footprint. For example, in the portion of the conveying surface 24 as shown in FIG. 8, article B overlies ten load cells covering two columns C and five rows R. Optically detectable markers 80 on some or all belt rows, for example, may be used by the vision system to identify absolutely which ten load cells are covered by article B. In this example, the vision system reads the marker, which may be coded or simply the number 10 indicating that it is on row 10 of the belt. With the a priori knowledge of the array geometry and the footprint of article B with respect to row 10, the vision system can identify the ten capacitors underlying the article. The vision system can then execute a weighing process 81 that combines the measurements of the capacitors at absolute positions $P_{RC}=\{(R, C)\}=\{(11, 2); (11, 3); (12, 2); (12, 3); (13, 2); (13, 3); (14, 2); (14, 3); (15, 2); (15, 3)\}$ to compute the weight of article B. The load-cell measurements may be combined, for example, by summing the individual load-cell measurements to compute a value equal or proportional to the weight of the underlying article. Each of the articles is marked with identifying indicia 82, such as a bar code, that a reader in the vision system can interpret. In that way, the computed weight can be associated with a specific individual article. And, because the vision system visions the entire width of the belt, articles do not have to be arranged in a single file over a static weighing station in the carryway. Furthermore, the resonant-circuit array in the belt allows the weight to be measured without stopping the belt. A video display of the vision system may be used to monitor system operating conditions and settings or the weights of individual articles. The controller 108 may be a programmable logic controller, a laptop, a desktop, or any appropriate computer device capable of executing the processes described.

The vision system could use other means to assign weights to individual articles. For example, the positions of each of the capacitors could be marked on the conveying surface 24 or the load-cell covers 26. The mark could identify each load cell explicitly or could just be a generic position mark, such as a dot 88 (FIG. 1) on each or a predetermined subset of the capacitors. If all the capacitor positions are marked, the vision system would not need a priori knowledge of the array layout. As another example, the vision system could alternatively select all those capacitors in an enlarged region 90 (FIG. 8) about the article footprint and sum their measurements. The capacitors not under the article D would yield measurement values of zero, which would not add to the weight. This ensures that the entire article is weighed accurately. If, of course, another article is close by, the enlarged region has to be carefully selected so as not to encompass the nearby article.

If the articles are separated enough so that no two articles are atop the same or adjacent capacitors, the weight of each article can be determined by summing the load-cell measurements of contiguous, non-zero-reading load cells.

Although the weighing system has been described in detail with reference to a few versions, other versions are possible. For example, the conveyor belt need not be a modular plastic conveyor belt. It could be a flat belt or a slat conveyor, for instance. As another example, visioning algorithms and detectable markers on the belt other than those described could be used by the vision system to identify individual articles and the load cells underlying them. So, as these few examples suggest, the scope of the claims is not meant to be limited to the details of the exemplary versions.

What is claimed is:

1. A weighing system comprising:
   a conveyor belt including:
      a belt body having a top side and an opposite bottom side;
      a plurality of passive resonant circuits disposed at individual positions within the belt body, each of the passive resonant circuits having a resonant frequency and including:
         a force-sensitive element changing the resonant frequency of the passive resonant circuit as a function of the force applied from conveyed articles on the top surface to the force-sensitive element;
   a plurality of measuring circuits external to and disposed near the bottom side of the conveyor belt, each of the measuring circuits including:
      an oscillator oscillating at a nominal frequency and coupled to one of the passive resonant circuits as the conveyor belt passes;
      wherein the passive resonant circuits are energized by the measuring circuits only when the measuring circuits are coupled to the passive resonant circuits as they pass closely by;
   wherein the changes in the resonant frequency of the passive resonant circuit change the frequency of the oscillator from its nominal frequency as a function of the force applied by conveyed articles on the top side of the conveyor belt to the force-sensitive element.

2. A weighing system as in claim 1 wherein the passive resonant circuits are arranged in columns extending along the length of the conveyor belt and wherein the measuring circuits are arranged in rows and columns under the conveyor belt.

3. A weighing system as in claim 1 wherein the plurality of passive resonant circuits have first and second inductive coils and wherein the second inductive coils are near the bottom side of the belt and the first inductive coils are near the bottom side of the belt to improve the inductive coupling.

4. A weighing system as in claim 1 wherein each of the passive resonant circuits includes:
   a capacitor; and
   an inductive coil electrically connected to the capacitor;
   wherein one of the inductive coil and the capacitor is the force-sensitive element.

5. A weighing system as in claim 1 wherein each of the plurality of measuring circuits includes a frequency detector determining the frequency of the oscillator and converting the determined frequency into a weight measurement.

6. A weighing system as in claim 5 wherein the frequency detector is a frequency counter.

7. A weighing system as in claim 5 wherein the frequency detector is a spectrum analyzer.

8. A weighing system as in claim 1 wherein the conveyor belt further includes a salient protrusion on the top side of the conveyor belt at each of the individual positions, wherein the weight of conveyed articles supported atop the salient protrusions is transmitted through the salient protrusions and the conveyor belt to the force-sensitive element.

9. A weighing system as in claim 8 wherein the force-sensing element is a capacitor having a capacitance that changes as a function of the force applied to change the resonant frequency of the passive resonant circuit.

10. A weighing system as in claim 9 wherein the capacitor has a fixed plate and a movable plate that moves relative to the first plate as a function of the force applied to change the capacitance of the capacitor.

11. A weighing system as in claim 8 wherein the force-sensing element is an inductor having an inductance that changes as a function of the force applied to change the resonant frequency of the passive resonant circuit.

12. A weighing system as in claim 11 wherein a force applied to the inductor changes at least one of the length, the shape, or the cross-sectional area of the inductor to change the inductance of the inductor.

13. A force-sensing system comprising:
   a conveyor belt including:
      a belt body having a top side and an opposite bottom side;
      a plurality of passive resonant circuits disposed at individual positions within the belt body, each of the passive resonant circuits having a resonant frequency and including:
         a force-sensitive element changing the resonant frequency of the passive resonant circuit as a function of a force applied to the force-sensitive element;
   a plurality of measuring circuits disposed external to and near the bottom side of the conveyor belt, each of the measuring circuits including:
      an oscillator oscillating at a nominal frequency and coupled to one of the passive resonant circuits as the conveyor belt passes;
      wherein the passive resonant circuits are energized by the measuring circuits only when the measuring circuits are coupled to the passive resonant circuits as they pass closely by;
   wherein the changes in the resonant frequency of the passive resonant circuit change the frequency of the oscillator from its nominal frequency as a function of the force applied to the force-sensitive element.

* * * * *

UNITED STATES PATENT AND TRADEMARK OFFICE
CERTIFICATE OF CORRECTION

PATENT NO. : 9,476,757 B2  
APPLICATION NO. : 14/253577  
DATED : October 25, 2016  
INVENTOR(S) : Lazlo Kleczewski Page 1 of 1

It is certified that error appears in the above-identified patent and that said Letters Patent is hereby corrected as shown below:

On the title page, item 72 Inventor line: delete "Lazio" and substitute --Lazlo--.

In the specification

Column 8 line 14 delete "sensing" and substitute --sensitive--.

Column 8 line 23 delete "sensing" and substitute --sensitive--.

Signed and Sealed this
Twentieth Day of December, 2016

Michelle K. Lee
*Director of the United States Patent and Trademark Office*